United States Patent
Busjaeger et al.

(10) Patent No.: US 10,719,533 B2
(45) Date of Patent: Jul. 21, 2020

(54) MULTI-TENANT TABLES OF A DISTRIBUTED DATABASE

(71) Applicant: salesforce.com, inc., San Francisco, CA (US)

(72) Inventors: Benjamin Busjaeger, San Carlos, CA (US); Scott Hansma, San Francisco, CA (US); Pallav Kothari, San Francisco, CA (US); Michael Sgroi, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 282 days.

(21) Appl. No.: 15/861,470

(22) Filed: Jan. 3, 2018

(65) Prior Publication Data

US 2019/0205459 A1    Jul. 4, 2019

(51) Int. Cl.
*G06F 16/27* (2019.01)
*G06F 16/22* (2019.01)

(52) U.S. Cl.
CPC ........ *G06F 16/278* (2019.01); *G06F 16/2255* (2019.01); *G06F 16/2282* (2019.01); *G06F 16/27* (2019.01)

(58) Field of Classification Search
CPC ................................ G06F 16/278; G06F 21/10
See application file for complete search history.

(56) References Cited

U.S. PATENT DOCUMENTS

| | | | | |
|---|---|---|---|---|
| 8,386,471 B2* | 2/2013 | Collins | ............... | G06F 16/2428 707/716 |
| 8,606,790 B2* | 12/2013 | Weissman | ........... | G06F 21/6218 707/741 |
| 9,632,878 B1* | 4/2017 | Maccanti | ............ | G06F 11/1469 |
| 10,031,935 B1* | 7/2018 | Cole | ....................... | G06F 16/278 |
| 10,152,577 B2* | 12/2018 | Li | ........................... | G06F 21/10 |
| 10,346,432 B2* | 7/2019 | Lipcon | .................. | G06F 16/278 |
| 2011/0082854 A1* | 4/2011 | Eidson | ................ | G06F 16/2462 707/714 |
| 2011/0246449 A1* | 10/2011 | Collins | ............. | G06F 16/24542 707/715 |
| 2012/0259894 A1* | 10/2012 | Varley | ...................... | G06F 16/93 707/795 |
| 2013/0060929 A1* | 3/2013 | Koponen | ............... | H04L 47/783 709/224 |
| 2013/0329584 A1* | 12/2013 | Ghose | .................... | H04L 45/586 370/252 |
| 2014/0096221 A1* | 4/2014 | Wallis | ................. | H04L 63/0807 726/9 |
| 2014/0207787 A1* | 7/2014 | Vohra | ...................... | G06F 16/90 707/741 |

(Continued)

*Primary Examiner* — Giovanna B Colan
(74) *Attorney, Agent, or Firm* — Holland & Hart LLP

(57) ABSTRACT

A system may store data in a shared table of a distributed database based on generating a tenant-specific partition key. The system may receive a message from a first tenant that indicates certain data to be written to or retrieved from a shared table (e.g., shared between multiple tenants). The system may then identify a data key, a tenant identifier, and a data type identifier associated with the data and generate a partition key that includes the data key, tenant identifier, and data type identifier. The system may then transmit the partition key to the shared table, and data may be written to or retrieved from the table based on the tenant-specific partition key.

17 Claims, 11 Drawing Sheets

(56) References Cited

U.S. PATENT DOCUMENTS

2014/0250436 A1* 9/2014 Tang .................... H04L 67/101
                                                            718/1
2017/0006135 A1* 1/2017 Siebel ....................... G06F 8/10

* cited by examiner

US 10,719,533 B2

MULTI-TENANT TABLES OF A DISTRIBUTED DATABASE

FIELD OF TECHNOLOGY

The present disclosure relates generally to database systems and data processing, and more specifically to multi-tenant tables of a distributed database.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may be configured to store and retrieve information for multiple tenants in a distributed database system. Because of the architecture of distributed database systems (e.g., Dynamo database systems), the information for each tenant may be stored in a tenant-specific table within the database system. This architecture may require the purchase and maintenance of individual tables for each tenant. In cases where the cloud platform manages hundreds or thousands of tenants, with wide-ranging levels of data traffic, the fixed cost and maintenance requirements of individual, tenant-specific tables may introduce monetary and computational inefficiencies for the cloud platform operator.

DETAILED DESCRIPTION

Figure 1:
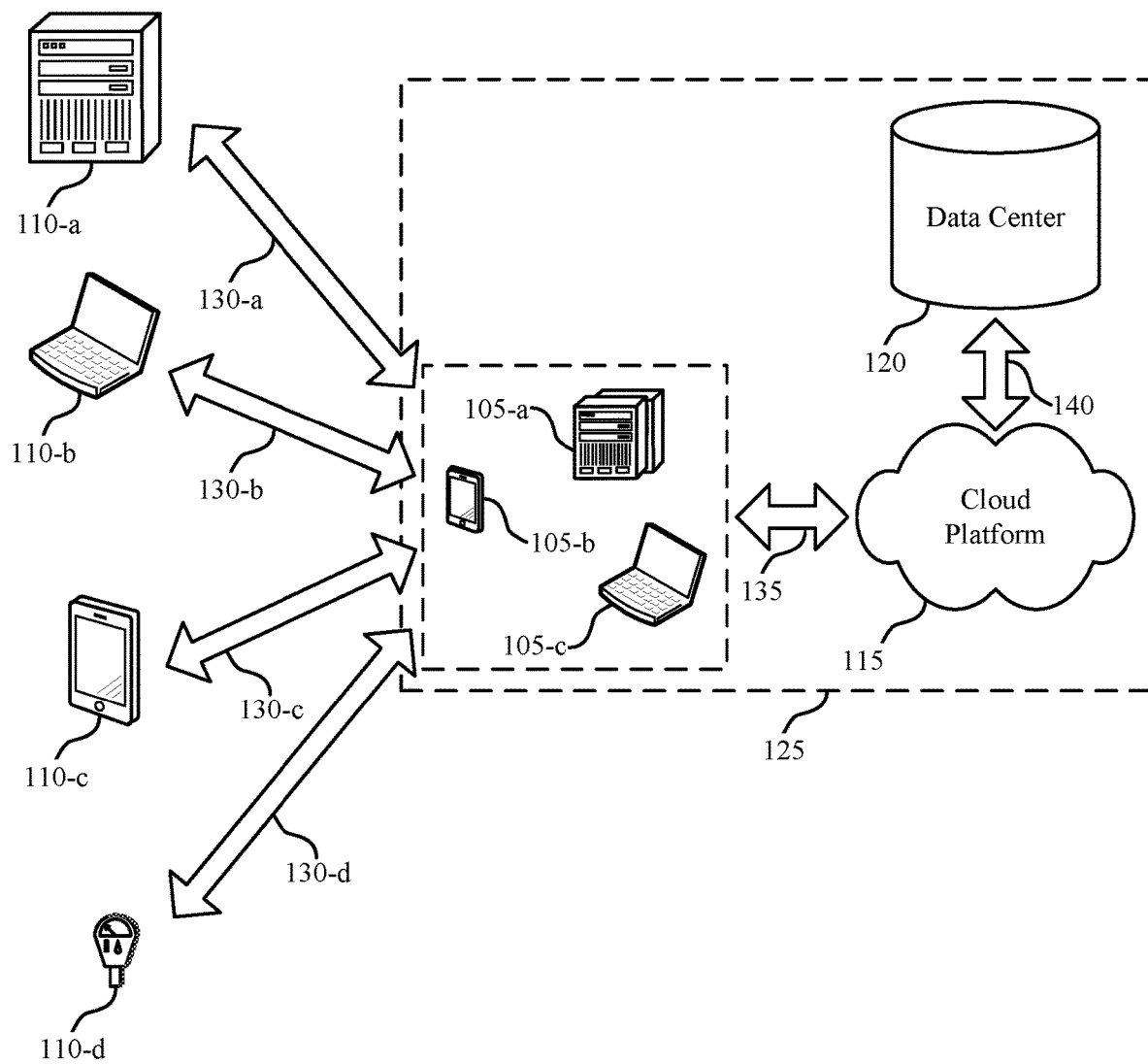
FIG. 1 illustrates an example of a system for storing data in a shared table of a distributed database that supports multi-tenant tables of a distributed database in accordance with aspects of the present disclosure.

A distributed database system may be configured to host applications with high throughput and low latency requirements (e.g., web applications). Such distributed database systems (e.g., Dynamo storage systems) may be optimized for single-tenant use cases. For example, each tenant may configure its own table within the database system based on the data structures and access patterns for that particular tenant. In such cases, each tenant may incur a fixed monetary and maintenance cost for each tenant-specific table. A multi-tenant platform may be configured to manage the data of many tenants, each with differing amounts of data traffic and data structures. Therefore, from the perspective of the multi-tenant platform, configuring individual, tenant-specific tables for each of its tenants on a distributed database system may incur significant monetary and computational costs and inefficiencies. In accordance with aspects of the present disclosure, techniques are described for storing data from multiple tenants in shared tables on a distributed database system. Such techniques may result in lowered monetary and maintenance costs for multi-tenant platform operators as well as increased system performance.

In a first example, a multi-tenant database server may receive a message from one or more tenants of a multi-tenant organization. The message may, for example, indicate data to be written to or retrieved from a shared table. For example, the message may indicate data to be written or retrieved from the table in response to a user's interaction with an application or web browser. Stated alternatively, the message may pertain to tenant-specific data in a table shared by multiple tenants. In some examples, one or more identifying features of the data to be written to or retrieved from the shared table may be identified. For example, a data key, tenant identifier, and a data type identifier may each be identified. The data key may, for example, pertain to the actual tenant-specific data. For example, the data key may pertain to a user record (e.g., a user's email address). In other examples, the tenant identifier may identify the specific tenant (e.g., "tenant1"), which may differentiate the tenant from one or more additional tenants (e.g., "tenant2"). Additionally or alternatively, for example, the data type identifier may identify a logical type of data (e.g., product data, a user record, etc.), such that the data written to or retrieved from the shared table may be more-easily identified. After identifying each of the data key, the tenant identifier, and the data type identifier, a tenant-specific partition key may be generated using each of the identified data key, the tenant identifier, and the data type identifier. Because each identified portion of the partition key is or relates to tenant-specific information, the partition key as a whole is tenant-specific. Upon generating the partition key, the key may be transmitted to the shared table. Because the partition key as a whole is tenant-specific, as discussed above, the table may include data associated with multiple tenants. Thus, transmitting the tenant-specific key to the shared table may indicate data to be written to or retrieved from the table based on the information prefixed in the partition key.

In other examples, the tenant-specific partition key may transmitted to a shared table based on identifying one or more attributes associated with the data. For example, the method may include identifying a sort key and a sort key type associated with the data. The sort key may, for example, correspond to at least one attribute associated with the data, such as a date, or a name of a product. Additionally or alternatively, multiple shared tables may exist depending on a type of sort key. For example, four shared tables may exist: a table for records that use a partition key only, a table for records that use a partition key and a sort key of type string, a table for records that use a partition key and a sort key of type number, and a table for records that use a partition key and a sort key type binary. Thus, the sort key type may indicate to which shared table the partition key and the sort key may be transmitted to.

In further examples, a secondary index that is associated with the data may be identified. The secondary index may be or may include additional identifying information associated with the data (e.g., additional to the attribute associated with the sort key). As described above, a sort key may determine which shared table the partition key may be transmitted to. Thus the secondary index may correspond to one or more additional attributes of the data that may aid in sorting or organizing the data within the particular shared table. For example, a sort key may relate to a title of a game, whereas the secondary index may be associated with specific scores (e.g., high scores) of the game. Thus the secondary index may allow for all of the game scores to be sorted (e.g., by high score to low score).

The partition key may then be generated, as described above, which may include the data key, the tenant identifier, and the data type identifier. The partition key and the sort key may then be transmitted to a shared table. The specific table may be determined based at least in part on the data type identifier. The partition key may then indicate data to be written to or retrieved from the particular table based on the information prefixed in the partition key.

Aspects of the disclosure are initially described in the context of an environment supporting an on-demand database service. Further aspects of the disclosure are described with respect to systems that support multi-tenant tables of a distributed database. Aspects of the disclosure are further illustrated by and described with reference to apparatus diagrams, system diagrams, and flowcharts that relate to multi-tenant tables of a distributed database.

FIG. 1 illustrates an example of a system 100 for cloud computing that supports multi-tenant tables of a distributed database in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud clients 105 of subsystem 125 may be examples of one or more computing devices and data center 120 may be an example of or include, as a component, a distributed database (e.g., a Dynamo data storage system) to which a cloud client 105 may send or retrieve information via the cloud platform 115. A distributed database may be configured to share resources (e.g., storage or computational resources) across a plurality of tenants. Data from the different tenants may be stored in shared tables and may be identified by a tenant-specific partition key or similar tenant-specific identifier.

In accordance with aspects of the present disclosure, the data center 120 may be configured to store data in one or more tables shared by a plurality of tenants (e.g., tenants of a multi-tenant organization). The data center 120 may receive a message from a first tenant (either directly or via cloud platform 115), which may indicate data to be written to or retrieved from the shared table. The message may, for example, correspond to at least one user record in the shared table. In some examples, multiple messages may be received from multiple tenants, for example as a streaming data flow (e.g., a real-time data flow) or as a batch data flow. The incoming messages may correspond to at least one user record in a shared table associated with each tenant from which a message is received.

For example, data center 120 may receive a message from a first tenant and may subsequently identify a data key, tenant identifier, and a data type identifier associated with the data. The data key may pertain to the tenant-specific data, such as a user record (e.g., an email address), and the data type identifier may identify a logical type of data (e.g., a user record) associated with the data. In some examples, the tenant identifier may identify the specific tenant to which the data is associated with. The data center 120 may then generate a partition key that includes at least the data key, the tenant identifier, and the data type identifier. Subsequently, for example, the partition key may be transmitted to the shared table. Thus the data indicated in the message may be written to or retrieved from the shared table based at least in part on the partition key. As described in more detail below, the partition key may be tenant-specific, and may include one or more additional identifiers and/or attributes of the data to be written to or retrieved from the shared table.

Figure 2:
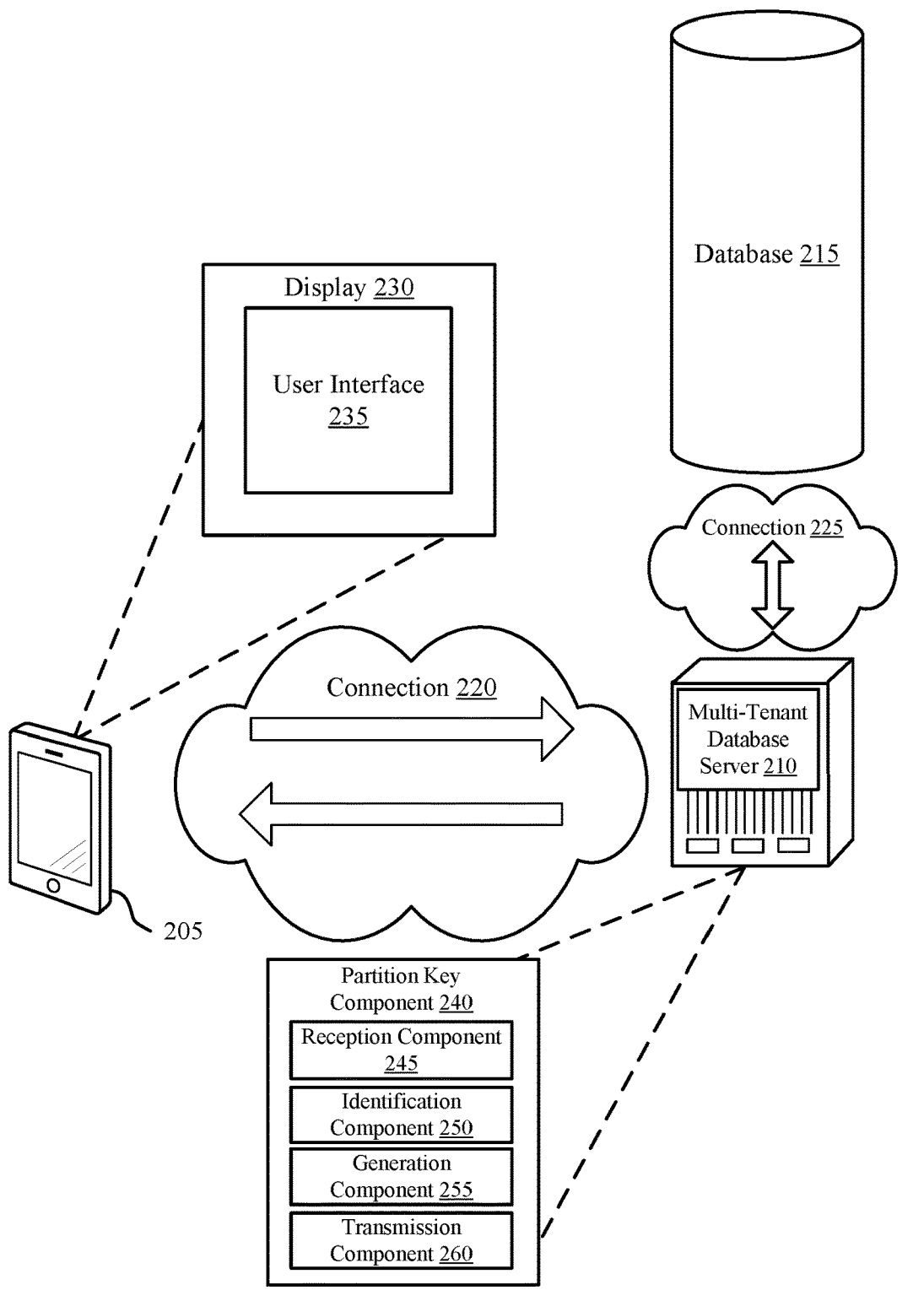
FIGS. 2 through 5 illustrates an example of a database system that supports multi-tenant tables of a distributed database in accordance with aspects of the present disclosure.

FIG. 2 illustrates an example of a system 200 that supports multi-tenant tables of a distributed database in accordance with various aspects of the present disclosure. The system 200 may include a computing device 205, which may be an example of a cloud client 105 as described with reference to FIG. 1; a multi-tenant database server 210, which may be an example of the data center 120 as described with reference to FIG. 1; and a database 215, which may be referred to as distributed database 215. In some cases, the multi-tenant database server 210 may be an example of components of a data center 120, a cloud platform 115, or some combination of these, as described with reference to FIG. 1. The system 200 may also include one or more connections, such as connection 220 and connection 225. In some examples, the computing device 205 may include display 230 and user interface 235. The multi-tenant database server 210 may include partition key component 240, which may include a plurality of modules—reception component 245, identification component 250, generation component 255, and transmission component 260.

In some examples, the computing device 205 may display a user interface 235 via a display 230. The user interface 235 may contain one or more fields to receive user input and/or may display one or more applications being run on computing device 205. In some examples, a user—via user interface 235—may interact with one or more applications that may utilize a shared table stored at database 215. For example, a user may interact with a web application in an attempt to carry out a certain task (e.g., check-out using a shopping cart feature). In some examples the web application may solicit additional information from the user (e.g., identifying information of the user), which may be stored at a shared table. Thus a message may be transmitted from the computing device 205 to the multi-tenant database server 210, and may correspond to the information solicited from the user. Stated alternatively, the multi-tenant database server 210 may receive a message from a first tenant of a plurality of tenants (e.g., from the computing device 205) that indicates data to be written to or retrieved from a shared table. In some examples, the data may correspond to at least one user record in the shared table.

Upon receiving the message at the multi-tenant database server 210, the server's partition key component 240 may identify certain features of the data prior to any data being written to or retrieved from the shared table. For example, reception component 245 may receive the message transmitted from computing device 205 that indicates the data to be written to or retrieved from the shared table. Additionally or alternatively, for example, the identification component 250 may identify a data key, a tenant identifier, and a data type identifier associated with the data. In some examples, the data type identifier may correspond to a logical type of data associated with the data.

As described above, identification component 250 may identify a tenant identifier associated with the data. The tenant identifier may pertain to the specific tenant attempting to write data to or retrieve data from the shared table. For example, a first tenant (e.g., "tenant1") may attempt to write to or retrieve data from the shared table. Thus, the unique tenant identifier may be "tenant1." However, a tenant identifier is not limited to the identifier "tenant" and a specific numerical identifier associated with the tenant. Rather, the tenant identifier is meant to be any descriptor of the tenant. Thus, the tenant identifier may be a business name, an individual's name, an entity type, or any other identifier that may be unique to the specific tenant. Stated alternatively, the tenant identifier may uniquely identify the tenant from any other tenant with similar identifying characteristics.

In some examples, identification component 250 may identify a data type identifier associated with the data. In some examples, the data type identifier may indicate what the specific data that is being written to or retrieved from the shared table pertains to. For example, the data type identifier may be "user" which may indicate to the shared table that the data pertains to a particular user. In another example, the data type identifier may be "product," which may pertain to a particular product. In some examples, the data type identifier may more-particularly, or more-uniquely describe a particular user or a particular product to differentiate the data from other data sets with similar identifying characteristics. Similar to the tenant identifier, as described above, the data type identifier may any potential descriptor of the data, so as to uniquely identify the data being written to or retrieved from the shared table.

In another example, identification component 250 may identify a data key associated with the data. The key may, for example, be or may pertain to the particular data being written to or retrieved from the shared table. For example, as described above, a tenant identifier may pertain to the specific tenant attempting to write to or retrieve data from the shared table—e.g., "tenant1." Additionally, for example, the data type identifier may indicate what the specific data is that is being written to or retrieved from the shared table— e.g., "user." Thus, in the example of a tenant identifier "tenant1" and a data type identifier "user," the data key may be the email address of the particular tenant (e.g., john.doe@mail.com). In another example, the tenant identifier may be "tenant2," the data type identifier may be "forum," and the data key may be "Holiday Party." Thus, the data key, the tenant identifier, and the data type identifier may collectively identify key characteristics and/or identifying features of the data.

After identifying the data key, the tenant identifier, and the data type identifier, generation component 255 may generate a partition key. In some examples, the partition key may include the data key, the tenant identifier, and the data type identifier. For example, the generation component 255 may prefix the data key, the tenant identifier, and the data type identifier. In the examples described above, using the tenant identifier "tenant1," data type identifier "user," and the data key "john.doe@mail.com," the generation component 255 may generate the partition key tenant1-user-john.doe@mail.com. Additionally or alternatively, for example, generation component 255 may generate a second partition key from a second user, which may be tenant2-user-jane.doe@mail.com. By creating unique partition keys, data specific to multiple tenants may be effectively stored to a shared table.

Upon generating the partition key, transmission component 260 may transmit the partition key (e.g., to database 215) to the shared table. In some examples, the tenant-specific data may be written to or retrieved from the shared table based in part on the partition key. For example, when a tenant enters a data key "john.doe@mail.com," the multi-tenancy layer (e.g., generation component 255) may compute the partition key as "tenant1-user-john.doe@mail.com," as described above. Transmission component 260 may then insert the partition key into the shared table, as opposed to a tenant-specific user table. In some examples, the tenant records may be stored in a logical or sequential order (e.g. sorted by tenant identifier—"tenant1," "tenant2," etc.). In other examples, the tenant records may be randomly distributed across the table. In the example of random distribution, the shared table may be better-equipped to scale to multiple tenants, as no one tenant is tied to a single partition (e.g., a second user is not, necessarily "tenant2).

In some examples, identification component 250 may also identify a sort key and a sort key type associated with the data. For example, the sort key may correspond to at least one attribute associated with the data and the sort key type may identify one or more attributes of the sort key (e.g., a sort key type number, string, binary, etc.). Identifying a sort key may be beneficial to order records by a certain attribute, which may result in more-efficiently writing data to and retrieving data from the shared table. For example, identification component 250 may identify a "date" as a sort key (e.g., 12/11/2017). Identifying a sort key may be beneficial to the data writing and retrieval process as sorting the values {2, 10} as strings in lexicographical order would result in (10, 2), whereas sorting them as numbers in natural order would result in (2, 10). As described above, ordering the data may improve efficiencies in writing data to and retrieving data from the shared table.

In some examples, the sort key type may pertain to one or more characteristics of the sort key, itself. Stated alternatively, the sort key type may be one of a sort key type number, a sort key type string, or a sort key type binary. For example, a sort key type number may be "1," a sort key type string may be "12/11/2017," and a sort key type binary may be "Dec. 11, 2017." The particular sort key type may determine which shared table of a plurality of shared tables to transmit the partition key to. However, regardless of which shared table the partition key may be transmitted to, the transmission component 260 may transmit both the partition key and the sort key to a shared table based in part on identifying the sort key.

As described above, the sort key type may be one of a sort key type number, a sort key type string, or a sort key type binary. Thus, in some examples, a determination component (not shown) of partition key component 240 may determine which shared table of a plurality of shared tables to transmit the partition key to. In some examples, the determination may be based at least in part on identifying the data type identifier associated with the data. Stated alternatively, the multi-tenant layer may determine which table data is written to or retrieved from based on the type-definition of the record. Thus, in some examples, four distinct tables may exist. The tables may be: a table for records that use a partition key only, a table for records that use a partition key and a sort key of type string, a table for records that use a partition key and a sort key of type number, and a table for records that use a partition key and a sort key type binary. Thus, depending on the type of data to be written or retrieved, the transmission component 260 may transmit the partition key and/or the sort key to the respective shared table, and the data may be subsequently written to or retrieved from the table.

In other examples, the identification component 250 may identify a secondary index associated with the data. The secondary index may, for example, correspond to one or more attributes that are different to the attribute associated with the sort key. Stated alternatively, the secondary index may correspond to a second identifying characteristic of the data. For example, the sort key may be a title of a game (e.g., "Galaxy Invaders"). In such an example, the secondary index may be a game high score. Because the sort key allows for the data pertaining to "Galaxy Invaders" to be sorted, the secondary index may allow for the data to be further-sorted, for example by high score. Thus the secondary index may be a mechanism for further-refining or sorting the data written to or retrieved from the shared table. In some examples, generation component 255 may generate the partition key based at least in part on identifying the secondary index.

Figure 3:
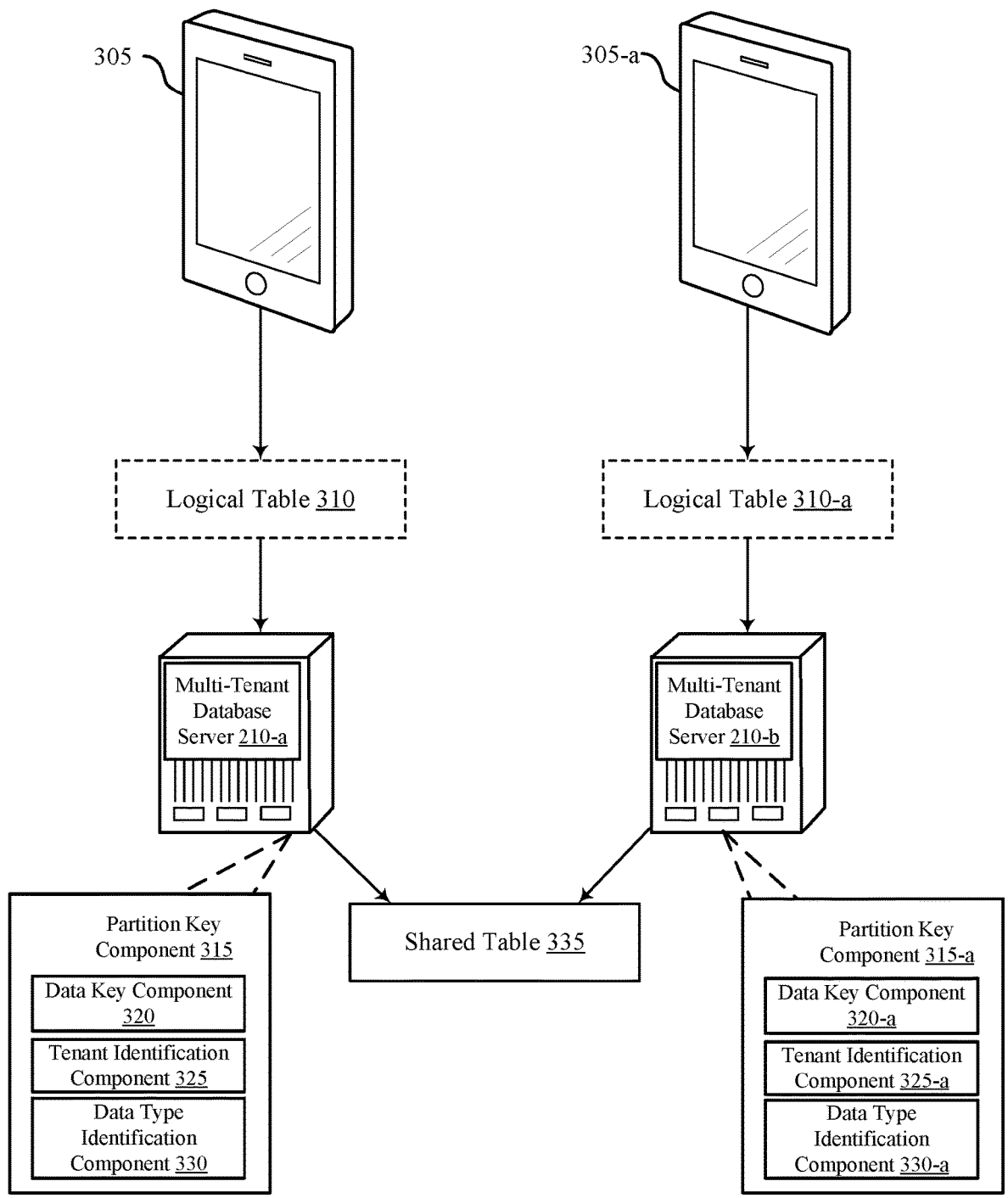

FIG. 3 illustrates an example of a system 300 that supports multi-tenant tables of a distributed database in accordance with various aspects of the present disclosure. The system 300 may include a first tenant 305; a second tenant 305-*a*; a logical table 310; a logical table 310-*a*; a multi-tenant database server 210-*a*, which may be an example of multi-tenant database server 210 as described with reference to FIG. 2; the first multi-tenant database server 210-*a* may include a first partition key component 315, which may include data key component 320, tenant identification component 325, and data type identification component 330. The system 300 may also include a multi-tenant database server 210-*b*, which may be an example of multi-tenant database server 210-*a*, as described above, or an example of multi-tenant database server 210 as described with reference to FIG. 2; multi-tenant database server 210-*b* may include a second partition key component 315-*a*, which may include data key component 320-*a*, tenant identification component 325-*a*, and data type identification component 330-*a*. The system 300 may also include a shared table 335. Partition key components 315 and 315-*a*, data key components 320 and 320-*a*, tenant identification components 325 and 325-*a*, data type identification components 330 and 330-*a*, and shared table 335 may be an example of or may relate to the partition key, identified data key, tenant identifier, data type identifier, and shared table, respectively, discussed with reference to FIG. 2.

In some examples, the first tenant 305 and second tenant 305-*a* may be examples of tenants utilizing a shared table 335 of a distributed database (e.g., database 215 as described with reference to FIG. 2). For example, each of first tenant 305 and second tenant 305-*a* may wish to write data to or retrieve data from shared table 335. In a first example, the first tenant 305 may insert a record (e.g., via a computing device) pertaining to a logical table 310. Stated alternatively, the information received from the first tenant 305 may be data that would be ordinarily stored to a first-tenant-specific table that includes user-related information (e.g., a name, address, email address, etc. of the first tenant 305). In some examples, logical table 310 may store information pertaining to the first tenant 305 in one place (e.g., logically, not physically). Accordingly, first-tenant-specific data stored at logical table 310 may, in some examples, eventually be physically stored at shared table 335, along with data specific to other tenants (e.g., tenants of a multi-tenant organization). Thus, for example, the first tenant 305 may enter the email address "john.doe@mail.com," and the name "John Doe."

Upon receiving the record from the first tenant 305, partition key component 315 may generate a first partition key. To generate the first partition key, as described above, data key component 320, tenant identification component 325, and data type identification component 330 identify a data key, tenant identifier, and data type, respectively. Given the information "john.doe@mail.com" and "John Doe," the tenant-specific partition key may be generated. For example, the tenant identification component 325 may identify "tenant1" as the tenant identifier. In some examples, such an identification may be arbitrary, while in other examples the tenant identifier may be assigned sequentially depending on the number of other tenants that have accessed the shared table 335. After identifying the tenant identifier, the data type identification component 330 may identify a specific data type to be associated with the partition key. As described above, the tenant-specific record may pertain to a user table (e.g., logical table 310). Thus, in such an example, the data type identifier "user" may be identified. Finally, for example, the user's email address may serve as the data key, which may be identified by data key component 320. In another example, the user's name might be identified by the data key component 320. Thus, based on the data key, the tenant identifier, and the data type being identified, partition key component 315 may generate a partition key. Thus, using the aforementioned examples, the partition key "tenant1-user-john.doe@mail.com" may be generated. This partition key may be used, for example, to write the data "John Doe" to the shared table 335 using the tenant-specific partition key.

In another example, the second tenant 305-a may insert a record (e.g., via a computing device) pertaining to a logical table 310-a. Stated alternatively, the information received from the second tenant 305-a may be data that would be ordinarily stored to a second-tenant-specific table that includes product-related information (e.g., a name of a specific product). Accordingly, second-tenant-specific data stored at logical table 310-a may, in some examples, eventually be physically stored at shared table 335, along with data specific to other tenants (e.g., tenants of a multi-tenant organization). Thus, for example, the second tenant 305-a may enter a type "book" and an identification "1."

Upon receiving the record from the second tenant 305-a, partition key component 315-a may generate a second-tenant-specific partition key. To generate the partition key, as described above, data key component 320-a, tenant identification component 325-a, and data type identification component 330-a must first identify a data key, tenant identifier, and data type, respectively. Given the information "book" and "1," the tenant-specific partition key may be generated. For example, the tenant identification component 325-a may identify "tenant2" as the tenant identifier. In some examples, such an identification may be arbitrary, while in other examples the tenant identifier may be assigned sequentially depending on the number of other tenants that have accessed the shared table 335. After identifying the tenant identifier, the data type identification component 330-a may identify a specific data type associated with the data. As described above, the tenant-specific record may pertain to a product table (e.g., logical table 310-a). Thus, in such an example, the data type identifier "book" may be identified. Finally, for example, the identifying characteristic—"1"—entered by the second tenant 305-a may serve as the data key, which may be identified by data key identification component 320-a. Thus, based on the data key, the tenant identifier, and the data type being identified, partition key component 315-a may generate a second-tenant-specific data key. Therefore, using the aforementioned examples, the partition key "tenant2-product-1" may be generated. This partition key may be used, for example, to write the data "Book" to the shared table 335 using the tenant-specific partition key.

Accordingly, in the aforementioned examples, both partition keys generated by partition key components 315 and 315-a may be transmitted to the shared table 335. This may allow for data to be written to or retrieved from shared table 335 by either the first tenant 305 or the second tenant 305-a. For example, a first row in the shared table may be uniquely-identified by the partition key "tenant1-user-john.doe@mail.com" and the second row in the shared table may be uniquely-identified by the partition key "tenant2-product-1." Accordingly first tenant 305 and second tenant 305-a may not have a need to utilize logical tables 310 and 310-a, respectively, but rather use one table shared by both tenants (e.g., shared table 335).

Figure 4:
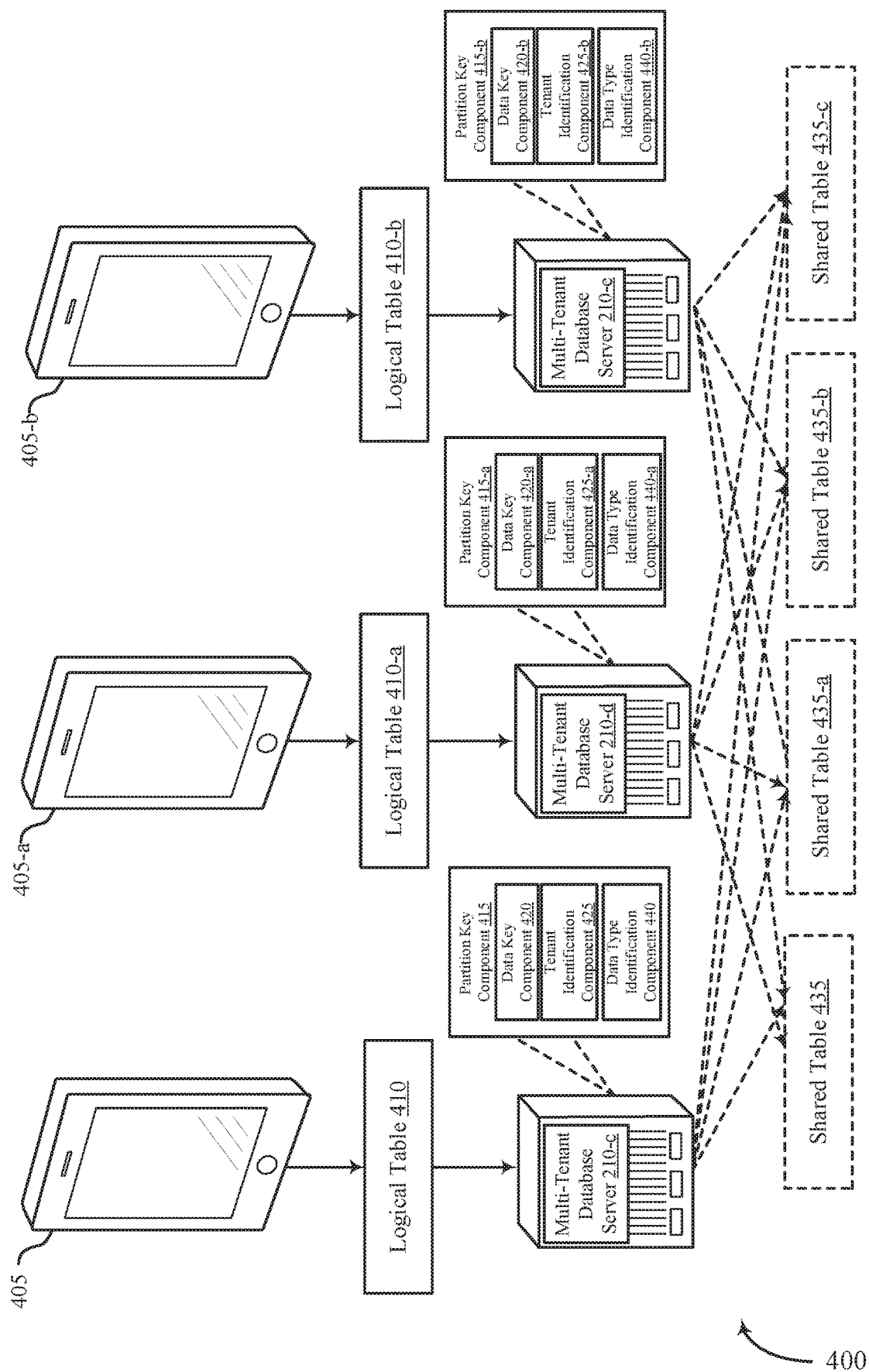

FIG. 4 illustrates an example of a system 400 that supports multi-tenant tables of a distributed database in accordance with various aspects of the present disclosure. The system 400 may include a first tenant 405, which may be an example of first tenant 305 as described with reference to FIG. 3; a second tenant 405-a, which may be an example of second tenant 305-a as described with reference to FIG. 3; and a third tenant 405-b. In some examples, the system 400 may also include logical tables 410, 410-a, and 410-b, which may be examples of logical tables 310 and 310-a as described with reference to FIG. 3. The system 400 may include first multi-tenant database server 210-c, second multi-tenant database server 210-d, and third multi-tenant database server 210-e, which may each be an example of multi-tenant database server as described with reference to FIG. 2. In some examples, first multi-tenant database server 210-c may include a first partition key component 415, which may include data key component 420, tenant identification component 425, and data type identification component 430. In some examples, second multi-tenant database server 210-d may include a second partition key component 415-a, which may include data key component 420-a, tenant identification component 425-a, and data type identification component 430-a. In other examples, third multi-tenant database server 210-e may include a third partition key component 415-b, which may include data key component 420-b, tenant identification component 425-b, and data type identification component 430-b. Partition key components 415, 415-a, and 415-b, data key identification components 420, 420-a, and 420-b, tenant identification components 425, 425-a, and 425-b, and data type identification components 430, 430-a, and 430-b, may be examples of or may relate to the partition key, identified data key, tenant identifier, data type identifier, and shared table, respectively, discussed with reference to FIGS. 2 and 3. Additionally or alternatively, for example, the system 400 may include shared tables 435, 435-a, 435-b, and 435-c which may be examples of shared table 335 as described with reference to FIG. 3.

In some examples, the first tenant 405 second tenant 405-*a*, and third tenant 405-*b* may be examples of tenants utilizing one or more shared tables of a distributed database (e.g., database 215 as described with reference to FIG. 2). For example, each of first tenant 405, the second tenant 405-*a*, and the third tenant 405-*b* may wish to write data to or retrieve data from one of shared tables 435-, 435-*a*, 435-*b*, or 435-*c*. In a first example, the first tenant 405 may insert a record (e.g., via a computing device) pertaining to a logical table 410. Stated alternatively, the information received from the first tenant 405 may be data that would be ordinarily stored to a first-tenant-specific table that includes user-related information (e.g., a name, address, email address, etc. of the first tenant 401). In some examples, logical table 410 may store information pertaining to the first tenant 405 in one place (e.g., logically, not physically). Accordingly, first-tenant-specific data stored at logical table 410 may, in some examples, eventually be physically stored at one of shared tables 435, 435-*a*, 435-*b*, or 435-*c*, along with data specific to other tenants (e.g., tenants of a multi-tenant organization). Thus, for example, the first tenant 405 may enter the email address "john.doe@mail.com," and the name "John Doe."

Upon receiving the record from the first tenant 405, partition key component 415 may generate a partition key. To generate a partition key, as described above, data key component 420, tenant identification component 425, and data type identification component 430 may identify a data key, tenant identifier, and data type, respectively. Given the information "john.doe@mail.com" and "John Doe," the tenant-specific partition key may be generated. For example, the tenant identification component 425 may identify "tenant1" as the tenant identifier. In some examples, such an identification may be arbitrary, while in other examples the tenant identifier may be assigned sequentially depending on the number of other tenants that have accessed a particular shared table. After identifying the tenant identifier, the data type identification component 430 may identify a data type associated with the data. As described above, the tenant-specific record may pertain to a logical table (e.g., logical table 410). Thus, in such an example, the data type identifier "user" may be identified. Finally, for example, the user's email address may serve as the data key identified by data key identification component 420. In another example, the user's name might be identified as the data key. Thus, based on the data key, the tenant identifier, and the data type identifier being identified, a first-tenant-specific partition key may be generated. Thus, using the aforementioned examples, the partition key "tenant1-user-john.doe@mail.com" may be generated. This partition key may be used, for example, to write the data "John Doe" to one of shared tables 435, 435-*a*, 435-*b*, or 435-*c* using the tenant-specific partition key.

In another example, the second tenant 405-*a* may insert a record (e.g., to a computing device) pertaining to a logical table 410-*a*. Stated alternatively, the information received from the second tenant 405-*a* may be data that would be ordinarily stored to a second-tenant-specific table that includes product-related information (e.g., a name of a specific product). In some examples, logical table 410-*a* may store information pertaining to the second tenant 405-*a* in one place (e.g., logically, not physically). Accordingly, second-tenant-specific data stored at logical table 410-*a* may, in some examples, eventually be physically stored at one of shared tables 435, 435-*a*, 435-*b*, or 435-*c*, along with data specific to other tenants (e.g., tenants of a multi-tenant organization). Thus, for example, the second tenant 405-*a* may enter a type "book" and an identification "1."

Upon receiving the record from the second tenant 405-*a*, partition key component 415-*a* may generate a partition key. To generate a partition key, as described above, data key identification component 430-*a*, tenant identification component 425-*a*, and data type identification component 430-*a* may identify a data key, a tenant identifier, and a data type, respectively. Given the information "book" and "1," the tenant-specific partition key may be generated. For example, the tenant identification component 425-*a* may identify "tenant2" as the tenant identifier. In some examples, such an identification may be arbitrary, while in other examples the tenant identifier may be assigned sequentially depending on the number of other tenants that have accessed one of the shared tables. After identifying the tenant identifier, the data type identification component 430-*a* may identify a data type associated with the data. As described above, the tenant-specific record may pertain to a logical table (e.g., logical table 410-*a*). Thus, in such an example, the data type identifier "book" may be identified. Finally, for example, the identifying characteristic—"1"—entered by the second tenant 405-*a* may serve as the data key identified by data key identification component 420-*a*. Thus, based on the data key, the tenant identifier, and the data type identifier being identified, partition key component 415-*a* may generate a second-tenant-specific partition key. Therefore, using the aforementioned examples, the partition key "tenant2-product-1" may be generated. This partition key may be used, for example, to write the data "Book" to one of shared tables 435, 435-*a*, 435-*b*, or 435-*c* using the tenant-specific partition key.

In a further example, the third tenant 405-*b* may insert a record (e.g., to a computing device) pertaining to a logical table 410-*b*. Stated alternatively, the information received from the third tenant 405-*b* may be data that would be ordinarily stored to a third-tenant-specific table that includes forum-related information. In some examples, logical table 410-*b* may store information pertaining to the third tenant 405-*b* in one place (e.g., logically, not physically). Accordingly, third-tenant-specific data stored at logical table 410-*b* may, in some examples, eventually be physically stored at one of shared tables 435, 435-*a*, 435-*b*, or 435-*c*, along with data specific to other tenants (e.g., tenants of a multi-tenant organization). Thus, for example, the third tenant 405-*b* may enter a topic "Holiday Party" and an date "2017/06/12."

Upon receiving the record from the third tenant 405-*b*, partition key component 415-*b* may generate a partition key. To generate a partition key, as described above, data key identification component 430-*b*, tenant identification component 425-*b*, and data type identification component 430-*b* may identify a data key, tenant identifier, and data type, respectively. Given the information "Holiday Party" and "2017/06/12," the tenant-specific partition key may be generated. For example, the tenant identification component 425-*b* may identify "tenant3" as the tenant identifier. In some examples, such an identification may be arbitrary, while in other examples the tenant identifier may be assigned sequentially depending on the number of other tenants that have accessed one of the shared tables. After identifying the tenant identifier, the data type identification component 430-*b* may identify a data type associated with the data. As described above, the tenant-specific record may pertain to a logical table (e.g., logical table 410-*b*). Thus, in such an example, topic "Holiday Party" may be identified. Finally, for example, the date—"2017/06/12"—entered by the third tenant 405-*b* may serve as the data key. Thus, based on the data key, the tenant identifier, and the data type identifier being identified, a third-tenant-specific partition key may be generated. Therefore, using the aforementioned examples, the partition key "tenant3-forum-Holiday Party" may be generated. This partition key may be used, for example, to write the data "2017/06/12" to one of shared tables 435, 435-a, 435-b, or 435-c using the tenant-specific partition key.

As described above, a sort key may be associated with the tenant-specific data. The sort key type may be one of a sort key type number, a sort key type string, or a sort key type binary. Thus, in some examples, four distinct shared tables may exist. The tables may be: a table for records that use a partition key only 435, a table for records that use a partition key and a sort key of type string 435-a, a table for records that use a partition key and a sort key of type number 435-b, and a table for records that use a partition key and a sort key type binary 435-c. Thus, depending on the type of data to be written or retrieved, the particular partition key may be transmitted to the respective shared table.

For example, in the aforementioned examples, the partition keys generated by partition key components 415, 415-a, and 415-b may be transmitted to one of shared tables 435, 435-a, 435-b, or 435-c depending on the data associated with the partition key. This may allow for data to be written to or retrieved from any one of shared tables 435, 435-a, 435-b, or 435-c by any one of the first tenant 405, the second tenant 405-a, or the third tenant 405-b. For example, the data associated with the first tenant 405 may not include a sort key. Thus, in such an example, the partition key may be transmitted only to the shared table that uses a partition key only 435. However, if the data associated with the first tenant 405 were to include a sort key, the partition key could be transmitted to any one of shared tables 435, 435-a, 435-b, or 435-c. In another example, the data associated with the second tenant 405-a (e.g., "1") 405-a may be identified as a sort key type number. Thus, in such an example, the partition key may be transmitted to the shared table for records that use a partition key and a sort key of type number 435-b. Additionally, for example, the data associated with the third tenant 405-b (e.g., "2017/06/12") may be identified as a sort key type string. Accordingly, the partition key may be transmitted to the shared table for records that use a partition key and a sort key of type string 435-a. In any aforementioned example, any of first tenant 405, second tenant 405-a, and third tenant 405-b may not have a need to utilize logical table 410, logical table 410-a, or logical table 410-b, respectively. Rather the tenants may use one table shared by all (e.g., one of shared table 435, 435-a, 435-b, or 435-c).

Figure 5:
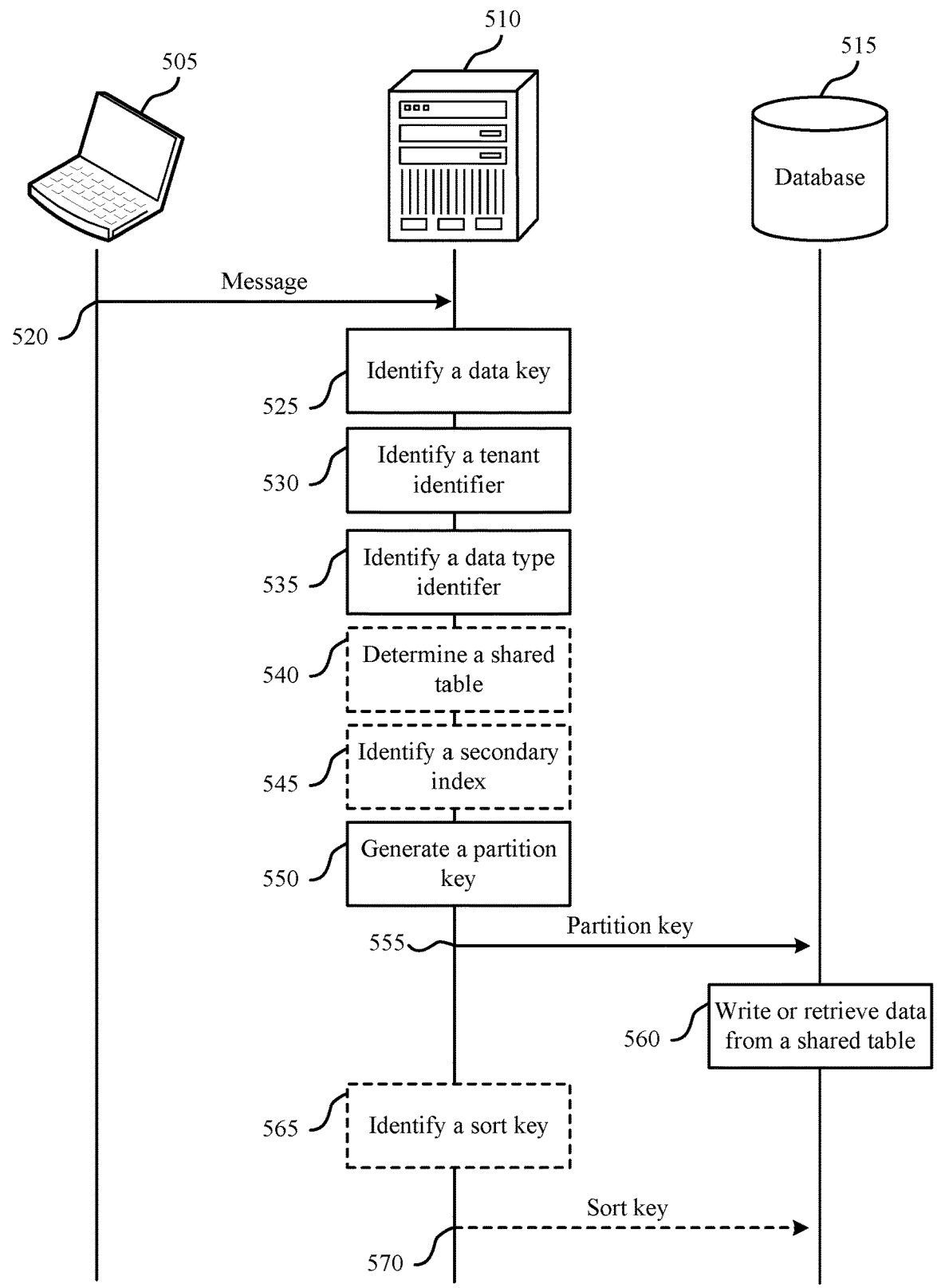

FIG. 5 illustrates an example of a system 500 that supports multi-tenant tables of a distributed database in accordance with various aspects of the present disclosure. The system 500 may include a computing device 505, which may be an example of computing device 205 as described with reference to FIG. 2; a multi-tenant database server 510, which may be an example of the multi-tenant database server 210 as described with reference to FIG. 2; and a database 515, which may be an example of database 215 as described with reference to FIG. 2.

System 500 may be an example of writing data to or reading data from a shared table in response to input received at the computing device 505. In some examples, the computing device 505 display a user interface (e.g., the user interface 235 as described with reference to FIG. 2), which may contain one or more fields to receive user input and/or may display one or more applications being run on computing device 505. As described above, a user may interact with one or more applications that may utilize a shared table stored at database 515. For example, a user may interact with a web application in an attempt to carry out a certain task (e.g., check-out using a shopping cart feature), which may solicit additional information from the user. In response, a message 520 may be transmitted from the computing device 505 to the multi-tenant database server 510, and may correspond to the information solicited.

Upon receiving the message 520 from the computing device 505, the multi-tenant database server may first identify a data key 525 associated with the message 520. As described above the data key may pertain to tenant-specific data, such as a user record (e.g., an email address). In some examples, the multi-tenant database server 510 may subsequently identify a tenant identifier 530 associated with the message 520. Again as described above, the tenant identifier may uniquely identify the tenant. Identifying a tenant identifier may ensure that the data written to or retrieved from the shared table is specific to the desired tenant. Additionally or alternatively, for example, the multi-tenant database server 510 may identify a data type identifier 535 associated with the data. The data type identifier may, for example, indicate what the specific data is that is being written to or retrieved from the shared table. Thus, the combination of the data key, the tenant identifier, and the data type identifier may uniquely identify characteristics of the data to be written to or retrieved from the shared table such that data from multiple tenants (e.g., of a multi-tenant organization) may be shared in a same table.

In some examples, after identifying the data type identifier 535, the multi-tenant database server 510 may also determine which shared table (e.g., of a plurality of shared tables) to transmit a partition key to 540. For example, as described above, four distinct tables may exist: a table for records that use a partition key only, a table for records that use a partition key and a sort key of type string, a table for records that use a partition key and a sort key of type number, and a table for records that use a partition key and a sort key type binary. Thus, without identifying a sort key, the multi-tenant database server 510 may only make a determination to transmit a partition key to a table for records that use a partition key only. However, if a sort key was previously identified, the multi-tenant database server 510 may determine any one of the four distinct tables to transmit the partition key and/or the sort key to.

In some examples, the multi-tenant database server 510 may also identify a secondary index. Secondary indexes may be provided by the underlying database 515 (e.g., a distributed database). For example, the secondary index may be determined after identifying a data type identifier 535 or after determining a shared table 540. As described above, a secondary may be related to one or more attributes different than an attribute associated with a sort key. Thus if a sort key was previously identified (e.g., a title of a game), the secondary index may further-organize the data, for example by high score. However, if a sort key has not been previously identified, a secondary index may aid in initially organizing the data. Stated alternatively, absent a sort key, a secondary index may facilitate the organization of data to be written to or retrieved from a shared table. If a secondary index is, indeed, identified, the multi-tenant database server 510 may generate a partition key 550 based at least in part on identifying the secondary index 545. However, if a secondary index is not present, the multi-tenant database server 510 may generate a partition key 550 based in part on identifying the data key 525, the tenant identifier 530, and the data type identifier 535.

The secondary index may define or may aid in the definition of a set of static indexes in each of the shared tables. The secondary index may be predefined based on a type of user access patterns. For example, the table for records that use a partition key only, the table for records that use a partition key and a sort key of type string, the table for records that use a partition key and a sort key of type number, and the table for records that use a partition key and a sort key type binary may each contain a set of predefined static fields that support the concept of secondary indexes. As described above, the partition key may identify particular attributes associated with the tenant-specific data. Because data associated with a plurality of tenants (e.g., tenants of a multi-tenant organization) may be shared in a same table, one table may contain a variety of data types (e.g., game-related data, shopping cart-related data, social media-related data, etc.). Thus, by predefining the types of indexes that may be generated within any given shared table, the data within the table may be more-efficiently organized and sorted.

For example, a partition key "tenant1-game-101" and a sort key "Galaxy Invaders" (e.g., a game) may be received by a shared table. Because it may be desirable to sort all data pertaining to "Galaxy Invaders" by a high score, the shared table may include a predefined field for sorting the game data by high score. Thus, the table may map the partition key "tenant1-game-101" and the sort key "Galaxy Invaders" to an index partition key "tenant1-game-Galaxy Invaders" and an index number sort key "136" (e.g., the game score). Thus the secondary index may include the index partition key and the index number sort key, which may allow for data pertaining to "tenant1" and the game "Galaxy Invaders" to be sorted by game score. Additionally, for example, a partition key "tenant1-game-102" and a sort key "Galaxy Invaders" may be mapped to the partition key "tenant1-game-Galax Invaders" and an index number sort key "151" (e.g., the game score). Thus the secondary index may include the index partition key and the index number sort key, which may allow for this additional data pertaining to "tenant1" and the game "Galaxy Invaders" to be stored by both game scores stored in the shared table.

In an additional example, the tenant (e.g., "tenant1") may create a table that defines a data type as "game name," a sort key as "score," and the data key as "["username", "date"]." In order to efficiently retrieve scores for a particular user, the tenant may also define the secondary index as: data type "game name," sort key "score," and data key "["game name"]." An insert request for this table may appear as: tenant identifier "tenant1," table "game," and data key "{"game name": "Space Invaders", "user name": "j.doe", "score": "100", "date": "2017/12/12"}." The request may be processed by first determining which shared table to store the data to. In the example mentioned above, the table may be a table with a number-typed range, in order for the records to be sorted by score for each game. The multi-tenant database server 510 may then determine whether any of the predefined secondary indexes must be updated, given the request. Because the tenant defined a secondary index having a number-typed sort key, the multi-tenant database server 510 may map the tenant index (e.g., (pk=user, sk=score)) to a generic index (e.g., an index of type pk=string and sk=number). The multi-tenant database server 510 may then update the generic index with the relevant subset of data (e.g., user name, score, and game name). Since the index may be shared by different tenants, and the table may include different types of data, the multi-tenant database server 510 may generate a particular partition key that is representative of the above-referenced information.

When the tenant (e.g., "tenant1") issues a read request on the game table, the multi-tenant database server 510 may determine which shared table the records are stored in. The multi-tenant database server 510 may then determine which index to use to satisfy the query. For example, the following read request may retrieve the top 5 scores for a particular game: Tenant: "tenant1"; table: "Game"; filter: "'game name=Space Invaders"; sort by: "'score' descending"; "limit: 5."

The multi-tenant database server 510 may determine, based on the filter condition, to use the primary index to satisfy the query. Therefore, the multi-tenant database server 510 may generate a particular partition key that is representative of the above-reference information, and may perform a range query on the primary index.

Similarly, the same tenant (e.g., "tenant1") may issue a read request to obtain the top 5 scores for a particular user. The read request may appear as: Tenant: "tenant1"; Table: "Game"; filter: "'user name=Space Invaders'"; sort by: 'score' descending"; limit: "5." In this example, the multi-tenant database server 510 may determine, based on the filter condition, to use the secondary index to perform the range query. The multi-tenant database server 510 may then generate a corresponding partition key by prefixing the user name with tenant and table name.

In the examples described above, each of the four shared-table-types may contain any number of predefined static fields. The fields may be created based metadata associated with the tenants. For example, metadata associated with each tenant may indicate, to the shared tables, what types of static fields to create. For example, if metadata associated with a first tenant pertains to the game "Galaxy Invaders," the predefined fields may be game-related (e.g., high score, low score, etc.). Accordingly, the predefined fields may be automatically-generated (e.g., generated based on tenant-specific metadata), rather than being manually generated (e.g., manually determining what fields to create).

After generating the partition key 550, the multi-tenant database server may transmit the partition key 555 to the shared table (e.g., at database 515). In some examples, the partition key may include the data key, the tenant identifier, and the data type identifier. In other examples, the partition key may be transmitted based at least in part on identifying the secondary index 545. In either example, data may be written to or retrieved from the shared table 560 based at least in part on transmitting the partition key 555 to the shared table. Thus, by utilizing the partition key to write data to or retrieve data from the shared table, the table may be effectively shared between multiple tenants (e.g., of a multi-tenant organization).

In some examples, as described above, the multi-tenant database server 510 may identify a sort key 565. In some examples, the multi-tenant database server 510 may identify a sort key and a sort key type associated with the data. Because the sort key type may be one of a sort key type number, a sort key type string, or a sort key type binary, the multi-tenant database server 510 may determine which shared table of a plurality of shared tables to transmit the partition key to. For example, the determination may be based at least in part on identifying the data type identifier associated with the data. Thus, depending on the type of data to be written or retrieved, determination of the share table type 540 may be dependent on the presence of a sort key. Accordingly, the sort key may be transmitted 570 to the shared table along with the partition key 555.

Figure 6:
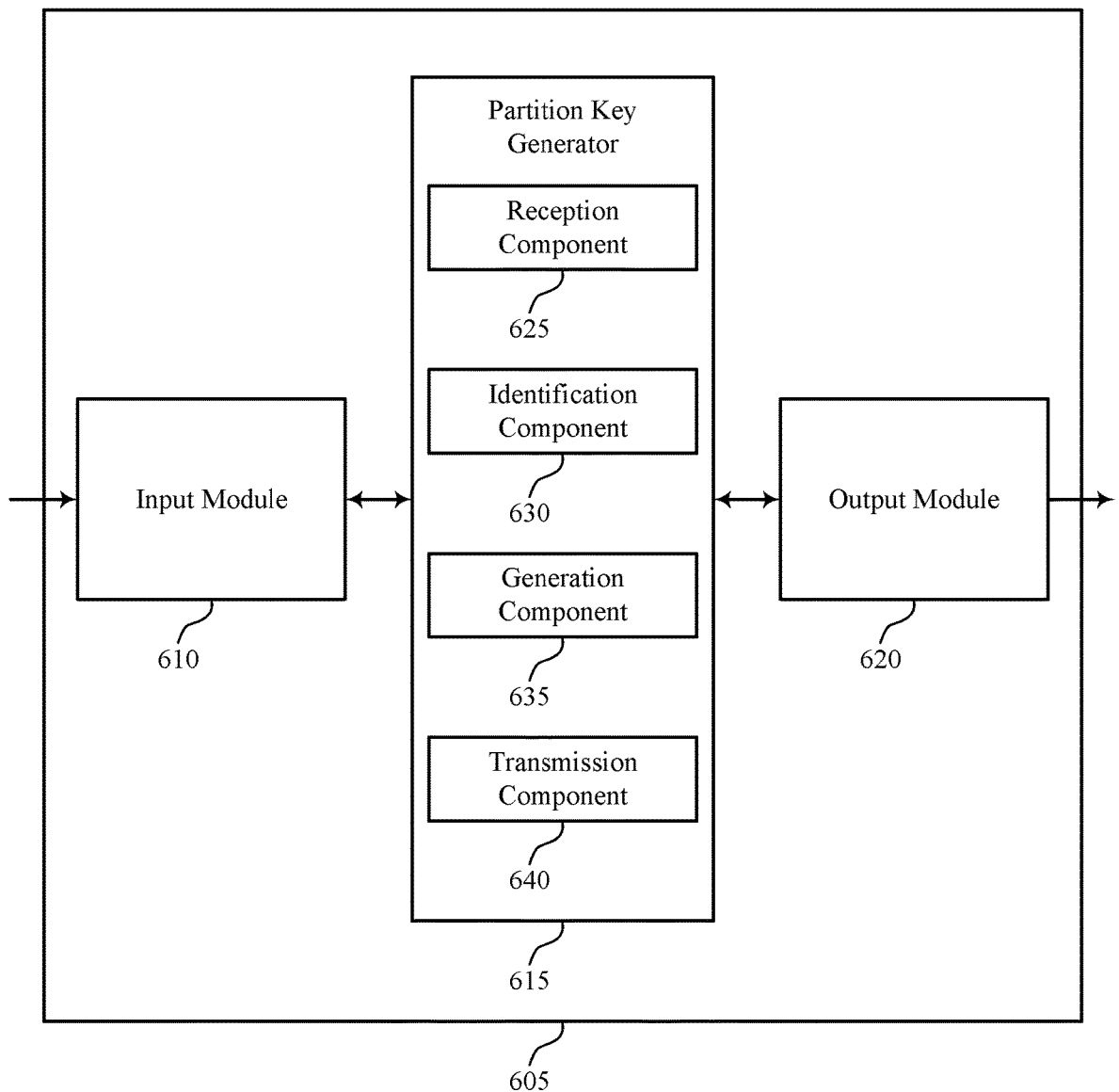
FIGS. 6 through 7 show block diagrams of a device that supports multi-tenant tables of a distributed database in accordance with aspects of the present disclosure.

FIG. 6 shows a block diagram 600 of an apparatus 605 that supports multi-tenant tables of a distributed database in accordance with aspects of the present disclosure. Apparatus 605 may include input module 610, partition key generator 615, and output module 620. Apparatus 605 may also include a processor. Each of these components may be in communication with one another (e.g., via one or more buses). In some cases, apparatus 605 may be an example of a user terminal, a database server, or a system containing multiple computing devices.

Partition key generator 615 may be an example of aspects of the partition key generator 815 described with reference to FIG. 8.

Partition key generator 615 and/or at least some of its various sub-components may be implemented in hardware, software executed by a processor, firmware, or any combination thereof. If implemented in software executed by a processor, the functions of the partition key generator 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The partition key generator 615 and/or at least some of its various sub-components may be physically located at various positions, including being distributed such that portions of functions are implemented at different physical locations by one or more physical devices. In some examples, partition key generator 615 and/or at least some of its various sub-components may be a separate and distinct component in accordance with various aspects of the present disclosure. In other examples, partition key generator 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Partition key generator 615 may also include reception component 625, identification component 630, generation component 635, and transmission component 640.

Reception component 625 may receive a message from a first tenant of a set of tenants that indicates data to be written to or retrieved from the shared table, the data corresponding to at least one user record in the shared table.

Identification component 630 may identify a data key associated with the data, a tenant identifier associated with the data, and a data type identifier associated with the data. In some examples, the tenant identifier may correspond to the first tenant of the set of tenants and the data type identifier may correspond to a logical type of data associated with the data. Identification component 630 may identify a sort key and a sort key type associated with the data, the sort key corresponding to at least one attribute associated with the data, and identify a secondary index associated with the data, the secondary index corresponding to one or more attributes that are different than at least one attribute corresponding to a sort key.

Generation component 635 may generate a partition key, where the partition key includes the data key, the tenant identifier, and the data type identifier and generate the partition key based on identifying the secondary index. In some cases, the data written to or retrieved from the shared table based at least on the partition key is sorted according to the secondary index.

Transmission component 640 may transmit the sort key to the shared table and transmit the partition key to the shared table, where the data is written to or retrieved from the shared table based on the partition key.

Figure 7:
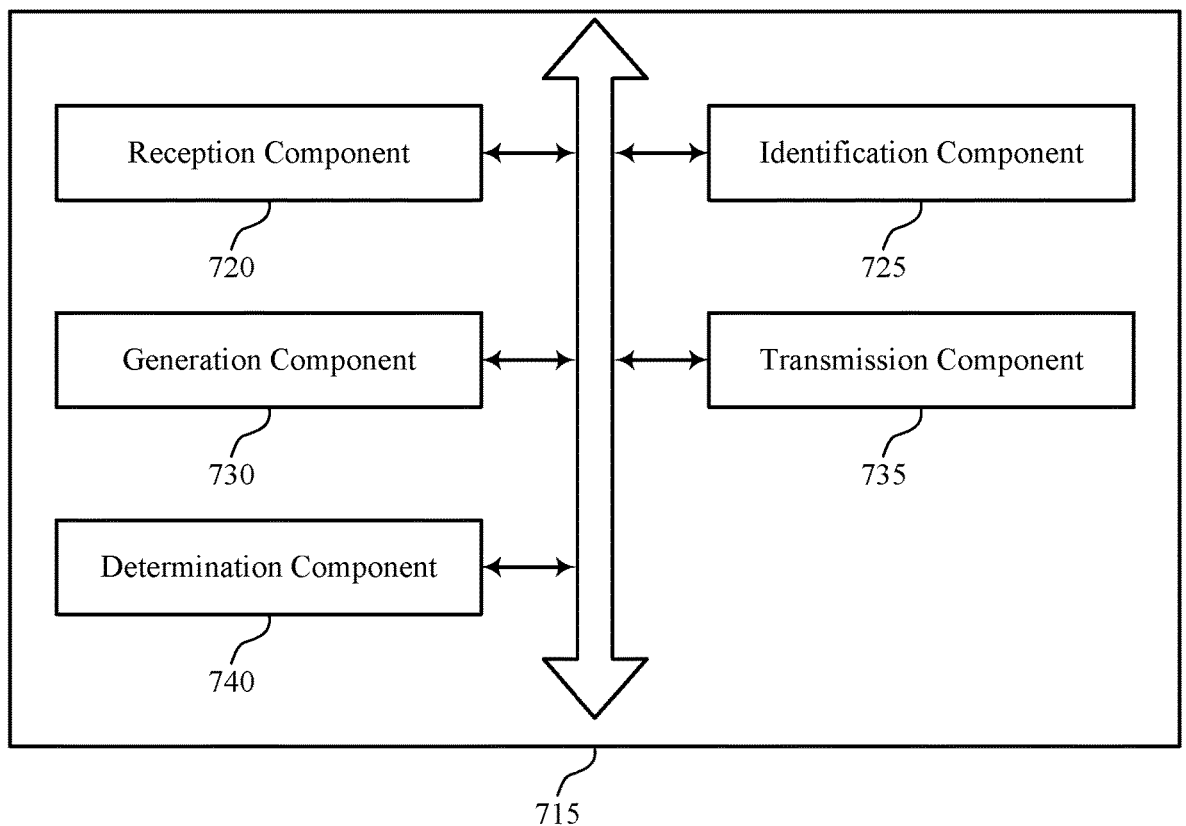

FIG. 7 shows a block diagram 700 of a partition key generator 715 that supports multi-tenant tables of a distributed database in accordance with aspects of the present disclosure. The partition key generator 715 may be an example of aspects of a partition key generator 815 described with reference to FIGS. 5, 6, and 8. The partition key generator 715 may include reception component 720, identification component 725, generation component 730, transmission component 735, and determination component 740. Each of these modules may communicate, directly or indirectly, with one another (e.g., via one or more buses).

Reception component 720 may receive a message from a first tenant of a set of tenants that indicates data to be written to or retrieved from the shared table, the data corresponding to at least one user record in the shared table.

Identification component 725 may identify a data key associated with the data, a tenant identifier associated with the data, and a data type identifier associated with the data. In some examples, the tenant identifier may correspond to the first tenant of the set of tenants and the data type identifier may correspond to a logical type of data associated with the data. In some examples, identification component 725 may identify a sort key and a sort key type associated with the data, the sort key corresponding to at least one attribute associated with the data, and identify a secondary index associated with the data, the secondary index corresponding to one or more attributes that are different than at least one attribute corresponding to a sort key.

Generation component 730 may generate a partition key, where the partition key includes the data key, the tenant identifier, and the data type identifier and generate the partition key based on identifying the secondary index. In some cases, the data written to or retrieved from the shared table based at least on the partition key may be sorted according to the secondary index.

Transmission component 735 may transmit the sort key to the shared table and transmit the partition key to the shared table, where the data is written to or retrieved from the shared table based on the partition key.

Determination component 740 may determine which shared table of a set of shared tables to transmit the partition key to base at least in part on identifying the data type identifier associated with the data, where the partition key and the sort key are transmitted based on the determination. In some cases, the sort key type includes one of a sort key type number, a sort key type string, or a sort key type binary.

Figure 8:
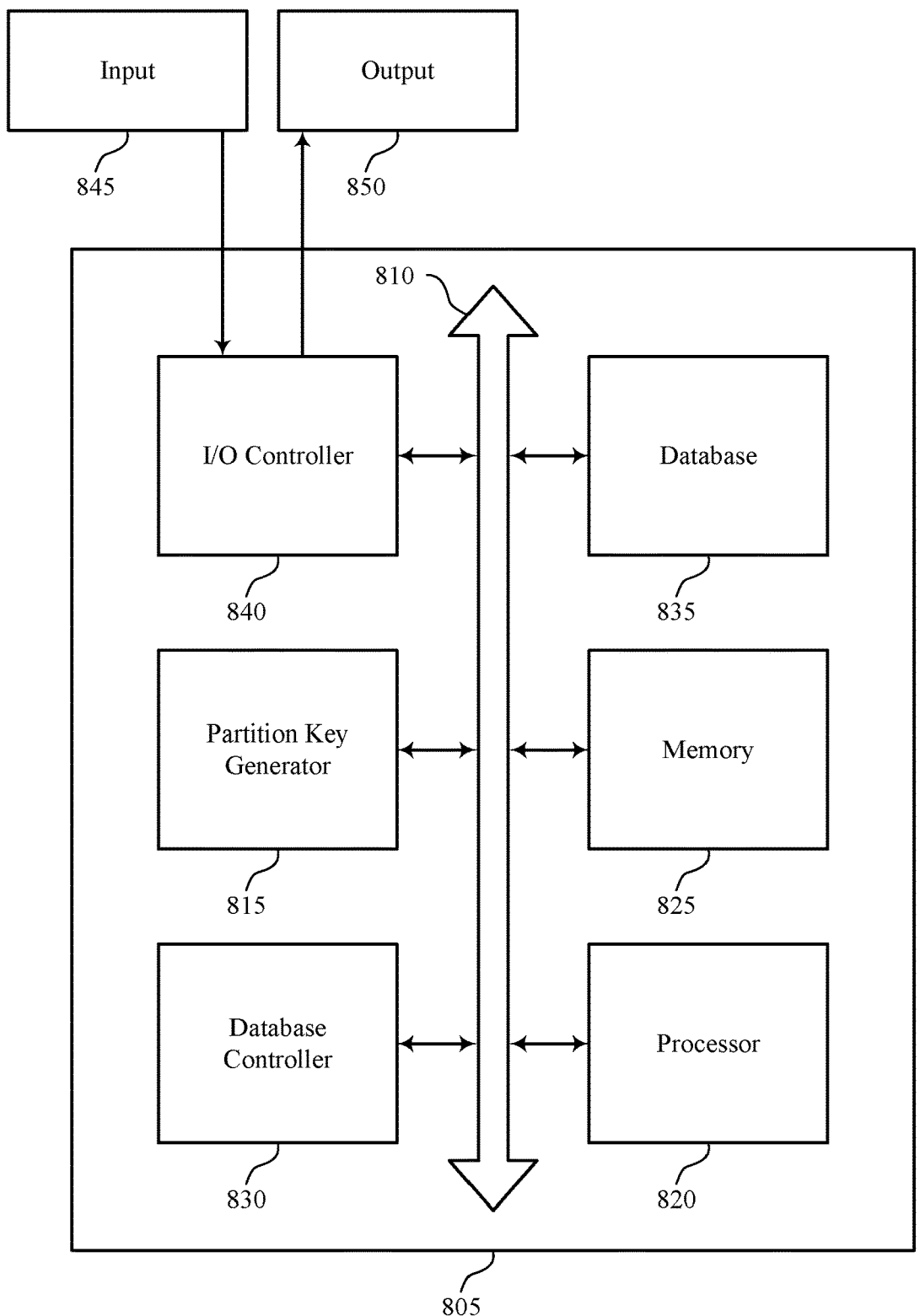
FIG. 8 illustrates a block diagram of a system including a database server that supports multi-tenant tables of a distributed database in accordance with aspects of the present disclosure.

FIG. 8 shows a diagram of a system 800 including a device 805 that supports multi-tenant tables of a distributed database in accordance with aspects of the present disclosure. Device 805 may be an example of or include the components of multi-tenant database server 210 as described above, e.g., with reference to FIG. 2. Device 805 may include components for bi-directional data communications including components for transmitting and receiving communications, including partition key generator 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting multi-tenant tables of a distributed database).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction.

Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
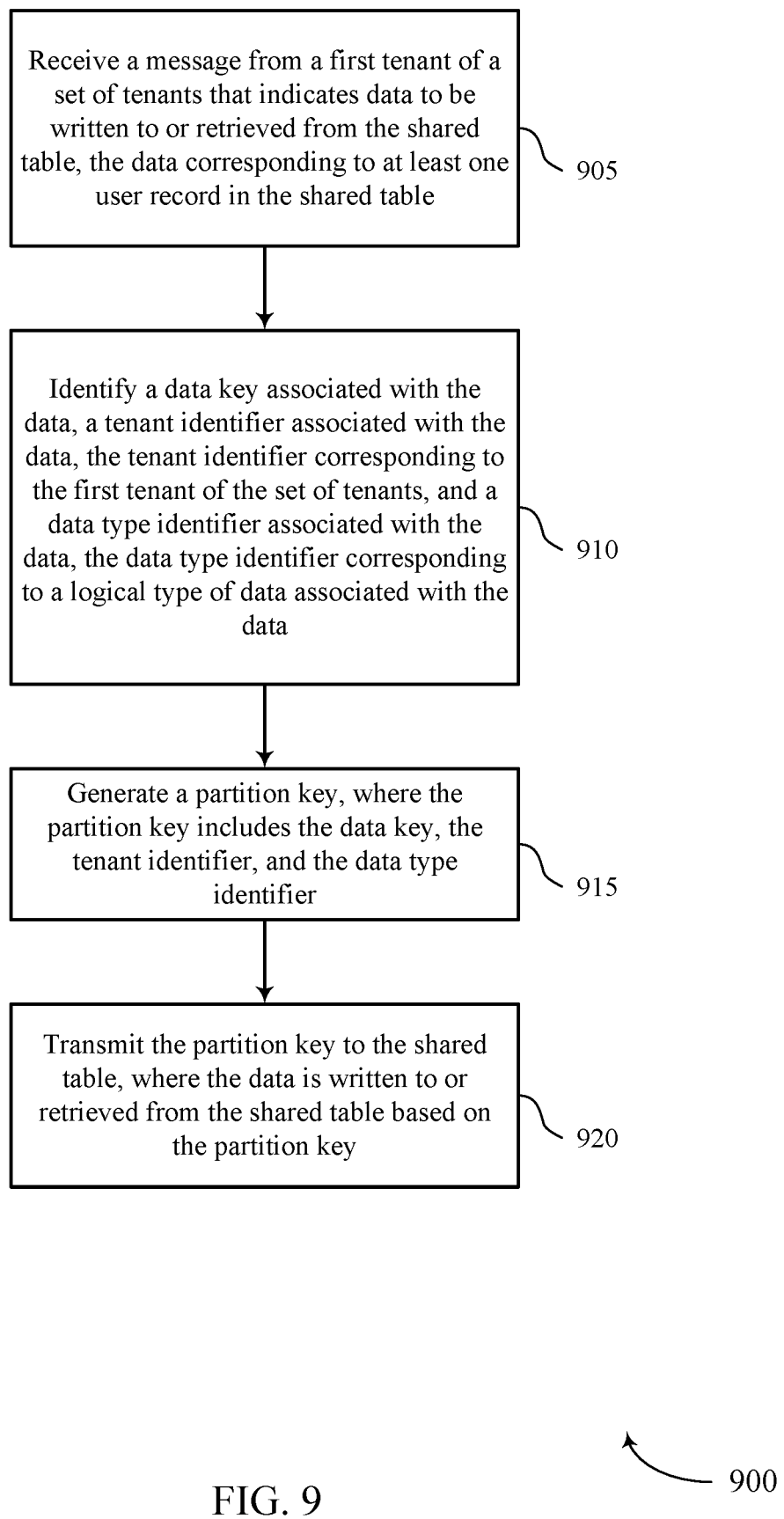
FIGS. 9 through 11 illustrate methods for multi-tenant tables of a distributed database in accordance with aspects of the present disclosure.

FIG. 9 shows a flowchart illustrating a method 900 for multi-tenant tables of a distributed database in accordance with aspects of the present disclosure. The operations of method 900 may be implemented by a database server (e.g., multi-tenant database server 210 as described with reference to FIG. 2) or its components as described herein. For example, the operations of method 900 may be performed by a partition key generator as described with reference to FIGS. 6 through 8. In some examples, a database server may execute a set of codes to control the functional elements of the device to perform the functions described below. Additionally or alternatively, the database server may perform aspects of the functions described below using special-purpose hardware.

At 905 the database server may receive a message from a first tenant of a plurality of tenants that indicates data to be written to or retrieved from the shared table, the data corresponding to at least one user record in the shared table. The operations of 905 may be performed according to the methods described herein. In certain examples, aspects of the operations of 905 may be performed by a reception component as described with reference to FIGS. 6 through 8.

At 910 the database server may identify a data key associated with the data, a tenant identifier associated with the data, the tenant identifier corresponding to the first tenant of the plurality of tenants, and a data type identifier associated with the data, the data type identifier corresponding to a logical type of data associated with the data. The operations of 910 may be performed according to the methods described herein. In certain examples, aspects of the operations of 910 may be performed by an identification component as described with reference to FIGS. 6 through 8.

At 915 the database server may generate a partition key, wherein the partition key comprises the data key, the tenant identifier, and the data type identifier. The operations of 915 may be performed according to the methods described herein. In certain examples, aspects of the operations of 915 may be performed by a generation component as described with reference to FIGS. 6 through 8.

At 920 the database server may transmit the partition key to the shared table, wherein the data is written to or retrieved from the shared table based at least in part on the partition key. The operations of 920 may be performed according to the methods described herein. In certain examples, aspects of the operations of 920 may be performed by a transmission component as described with reference to FIGS. 6 through 8.

Figure 10:
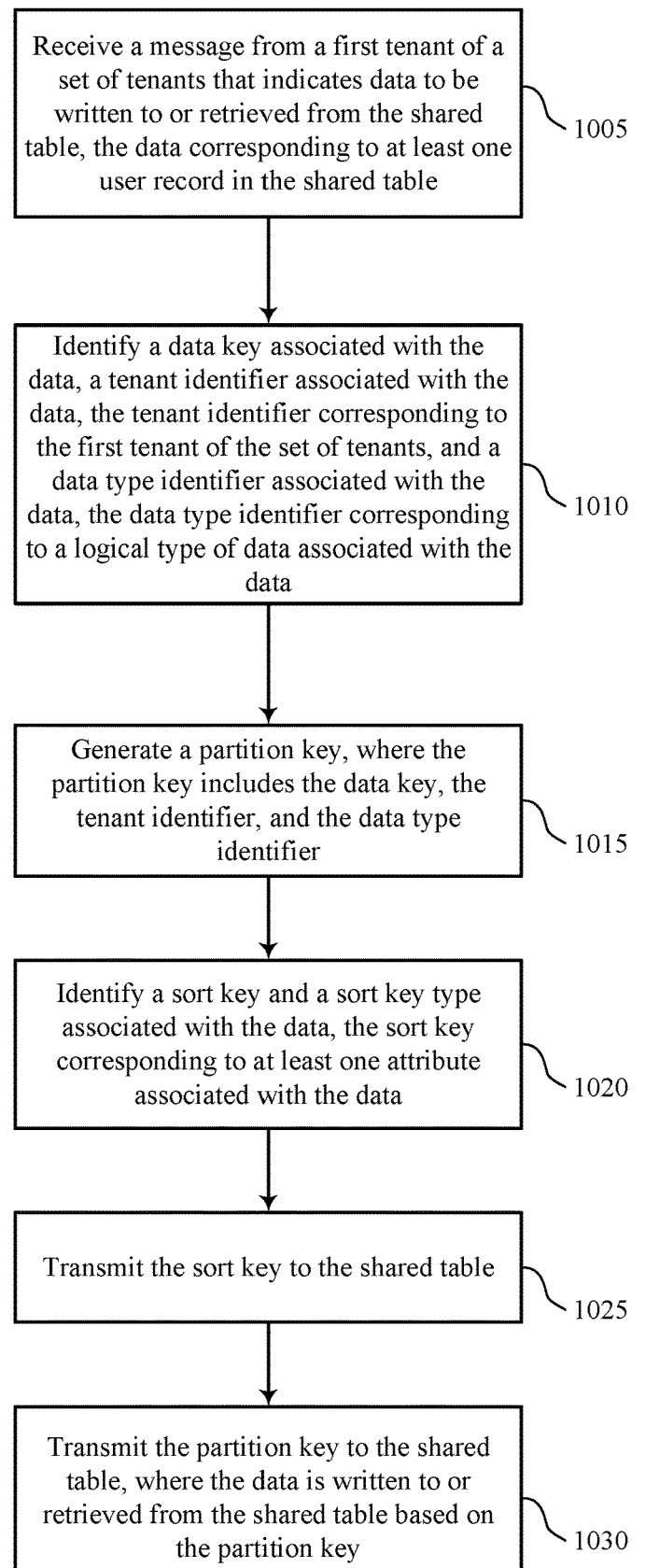

FIG. 10 shows a flowchart illustrating a method 1000 for multi-tenant tables of a distributed database in accordance with aspects of the present disclosure. The operations of method 1000 may be implemented by a database server (e.g., multi-tenant database server 210 as described with reference to FIG. 2) or its components as described herein. For example, the operations of method 1000 may be performed by a partition key generator as described with reference to FIGS. 6 through 8. In some examples, a database server may execute a set of codes to control the functional elements of the device to perform the functions described below. Additionally or alternatively, the database server may perform aspects of the functions described below using special-purpose hardware.

At 1005 the database server may receive a message from a first tenant of a plurality of tenants that indicates data to be written to or retrieved from the shared table, the data corresponding to at least one user record in the shared table. The operations of 1005 may be performed according to the methods described herein. In certain examples, aspects of the operations of 1005 may be performed by a reception component as described with reference to FIGS. 6 through 8.

At 1010 the database server may identify a data key associated with the data, a tenant identifier associated with the data, the tenant identifier corresponding to the first tenant of the plurality of tenants, and a data type identifier associated with the data, the data type identifier corresponding to a logical type of data associated with the data. The operations of 1010 may be performed according to the methods described herein. In certain examples, aspects of the operations of 1010 may be performed by an identification component as described with reference to FIGS. 6 through 8.

At 1015 the database server may generate a partition key, wherein the partition key comprises the data key, the tenant identifier, and the data type identifier. The operations of 1015 may be performed according to the methods described herein. In certain examples, aspects of the operations of 1015 may be performed by a generation component as described with reference to FIGS. 6 through 8.

At 1020 the database server may identify a sort key and a sort key type associated with the data, the sort key corresponding to at least one attribute associated with the data. The operations of 1020 may be performed according to the methods described herein. In certain examples, aspects of the operations of 1020 may be performed by an identification component as described with reference to FIGS. 6 through 8.

At 1025 the database server may transmit the sort key to the shared table. The operations of 1025 may be performed according to the methods described herein. In certain examples, aspects of the operations of 1025 may be performed by a transmission component as described with reference to FIGS. 6 through 8.

At 1030 the database server may transmit the partition key to the shared table, wherein the data is written to or retrieved from the shared table based at least in part on the partition key. The operations of 1030 may be performed according to the methods described herein. In certain examples, aspects of the operations of 1030 may be performed by a transmission component as described with reference to FIGS. 6 through 8.

Figure 11:
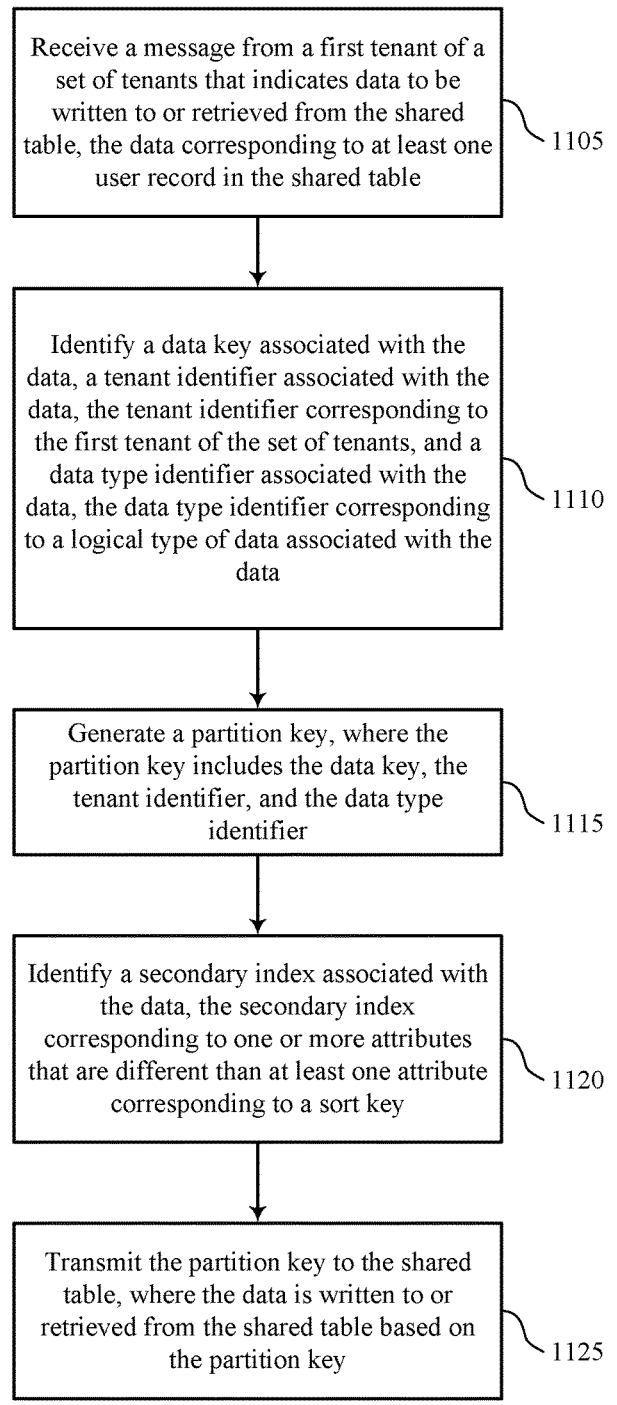

FIG. 11 shows a flowchart illustrating a method 1100 for multi-tenant tables of a distributed database in accordance with aspects of the present disclosure. The operations of method 1100 may be implemented by a database server (e.g., multi-tenant database server 210 as described with reference to FIG. 2) or its components as described herein. For example, the operations of method 1100 may be performed by a partition key generator as described with reference to FIGS. 6 through 8. In some examples, a database server may execute a set of codes to control the functional elements of the device to perform the functions described below. Additionally or alternatively, the database server may perform aspects of the functions described below using special-purpose hardware.

At 1105 the database server may receive a message from a first tenant of a plurality of tenants that indicates data to be written to or retrieved from the shared table, the data corresponding to at least one user record in the shared table. The operations of 1105 may be performed according to the methods described herein. In certain examples, aspects of the operations of 1105 may be performed by a reception component as described with reference to FIGS. 6 through 8.

At 1110 the database server may identify a data key associated with the data, a tenant identifier associated with the data, the tenant identifier corresponding to the first tenant of the plurality of tenants, and a data type identifier associated with the data, the data type identifier corresponding to a logical type of data associated with the data. The operations of 1110 may be performed according to the methods described herein. In certain examples, aspects of the operations of 1110 may be performed by an identification component as described with reference to FIGS. 6 through 8.

At 1115 the database server may generate a partition key, wherein the partition key comprises the data key, the tenant identifier, and the data type identifier. The operations of 1115 may be performed according to the methods described herein. In certain examples, aspects of the operations of 1115 may be performed by a generation component as described with reference to FIGS. 6 through 8.

At 1120 the database server may identify a secondary index associated with the data, the secondary index corresponding to one or more attributes that are different than at least one attribute corresponding to a sort key. The operations of 1120 may be performed according to the methods described herein. In certain examples, aspects of the operations of 1120 may be performed by an identification component as described with reference to FIGS. 6 through 8.

At 1125 the database server may transmit the partition key to the shared table, wherein the data is written to or retrieved from the shared table based at least in part on the partition key. The operations of 1125 may be performed according to the methods described herein. In certain examples, aspects of the operations of 1125 may be performed by a transmission component as described with reference to FIGS. 6 through 8.

A method of storing data in a shared table of a distributed database is described. The method may include receiving a message from a first tenant of a plurality of tenants that indicates data to be written to or retrieved from the shared table, the data corresponding to at least one user record in the shared table, identifying a data key associated with the data, a tenant identifier associated with the data, the tenant identifier corresponding to the first tenant of the plurality of tenants, and a data type identifier associated with the data, the data type identifier corresponding to a logical type of data associated with the data. In some examples, the method may include generating a partition key, wherein the partition key may include the data key, the tenant identifier, and the data type identifier, and transmitting the partition key to the shared table, wherein the data is written to or retrieved from the shared table based at least in part on the partition key.

Another apparatus for storing data in a shared table of a distributed database is described. The apparatus may include a processor, memory in electronic communication with the processor, and instructions stored in the memory. The instructions may be operable to cause the processor to receive a message from a first tenant of a plurality of tenants that indicates data to be written to or retrieved from the shared table, the data corresponding to at least one user record in the shared table, identify a data key associated with the data, a tenant identifier associated with the data, the tenant identifier corresponding to the first tenant of the plurality of tenants, and a data type identifier associated with the data, the data type identifier corresponding to a logical type of data associated with the data, generate a partition key, wherein the partition key may include the data key, the tenant identifier, and the data type identifier, and transmit the partition key to the shared table, wherein the data is written to or retrieved from the shared table based at least in part on the partition key.

A non-transitory computer-readable medium for storing data in a shared table of a distributed database is described. The non-transitory computer-readable medium may include instructions operable to cause a processor to receive a message from a first tenant of a plurality of tenants that indicates data to be written to or retrieved from the shared table, the data corresponding to at least one user record in the shared table, identify a data key associated with the data, a tenant identifier associated with the data, the tenant identifier corresponding to the first tenant of the plurality of tenants, and a data type identifier associated with the data, the data type identifier corresponding to a logical type of data associated with the data, generate a partition key, wherein the partition key may include the data key, the tenant identifier, and the data type identifier, and transmit the partition key to the shared table, wherein the data is written to or retrieved from the shared table based at least in part on the partition key.

Some examples of the method, apparatus, and non-transitory computer-readable medium described above may further include processes, features, means, or instructions for identifying a sort key and a sort key type associated with the data, the sort key corresponding to at least one attribute associated with the data. Some examples of the method, apparatus, and non-transitory computer-readable medium described above may further include processes, features, means, or instructions for transmitting the sort key to the shared table.

Some examples of the method, apparatus, and non-transitory computer-readable medium described above may further include processes, features, means, or instructions for determining which shared table of a plurality of shared tables to transmit the partition key to base at least in part on identifying the data type identifier associated with the data, wherein the partition key and the sort key may be transmitted based at least in part on the determination.

In some examples of the method, apparatus, and non-transitory computer-readable medium described above, the sort key type may include one of a sort key type number, a sort key type string, or a sort key type binary.

Some examples of the method, apparatus, and non-transitory computer-readable medium described above may further include processes, features, means, or instructions for identifying a secondary index associated with the data, the secondary index corresponding to one or more attributes that may be different than at least one attribute corresponding to a sort key. Some examples of the method, apparatus, and non-transitory computer-readable medium described above may further include processes, features, means, or instructions for generating the partition key based at least in part on identifying the secondary index.

In some examples of the method, apparatus, and non-transitory computer-readable medium described above, the data written to or retrieved from the shared table based at least on the partition key may be sorted according to the secondary index. In other examples of the method, apparatus, and non-transitory computer-readable medium described above, the distributed database may include a Distributed Hash Table (DHT). In some examples of the method, apparatus, and non-transitory computer-readable medium described above, the distributed database may include a Dynamo storage system. In other examples of the method, apparatus, and non-transitory computer-readable medium described above, the message may be associated with a specific application associated with the first tenant.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for storing data in a shared table of a distributed database, comprising:
   receiving a message from a first tenant of a plurality of tenants that indicates data to be written to or retrieved from the shared table, the data corresponding to at least one user record in the shared table;
   identifying a data key associated with the data, a tenant identifier associated with the data, the tenant identifier corresponding to the first tenant of the plurality of tenants, and a data type identifier associated with the data, the data type identifier corresponding to a logical type of data associated with the data;
   generating a partition key, wherein the partition key comprises the data key, the tenant identifier, and the data type identifier;
   identifying a sort key and a sort key type associated with the data, the sort key corresponding to at least one attribute associated with the data; and
   transmitting the partition key and the sort key to the shared table, wherein the data is written to or retrieved from the shared table based at least in part on the partition key, and the sort key type indicates the shared table of a plurality of shared tables to which the partition key and the sort key are transmitted.

2. The method of claim 1, further comprising:
   determining which shared table of the plurality of shared tables to transmit the partition key to based at least in part on identifying the data type identifier associated with the data, wherein the partition key and the sort key are transmitted based at least in part on the determination.

3. The method of claim 1, wherein the sort key type comprises one of a sort key type number, a sort key type string, or a sort key type binary.

4. The method of claim 1, further comprising:
   identifying a secondary index associated with the data, the secondary index corresponding to one or more attributes that are different than at least one attribute corresponding to the sort key; and
   generating the partition key based at least in part on identifying the secondary index.

5. The method of claim 4, wherein the data written to or retrieved from the shared table based at least on the partition key is sorted according to the secondary index.

6. The method of claim 1, wherein the distributed database comprises a Distributed Hash Table (DHT).

7. The method of claim 1, wherein the distributed database comprises a Dynamo storage system.

8. The method of claim 1, wherein the message is associated with a specific application associated with the first tenant.

9. An apparatus for storing data in a shared table of a distributed database, comprising:
   a processor;
   memory in electronic communication with the processor; and
   instructions stored in the memory and executable by the processor to cause the apparatus to:
      receive a message from a first tenant of a plurality of tenants that indicates data to be written to or retrieved from the shared table, the data corresponding to at least one user record in the shared table;
      identify a data key associated with the data, a tenant identifier associated with the data, the tenant identifier corresponding to the first tenant of the plurality of tenants, and a data type identifier associated with the data, the data type identifier corresponding to a logical type of data associated with the data;
      generate a partition key, wherein the partition key comprises the data key, the tenant identifier, and the data type identifier;
      identify a sort key and a sort key type associated with the data, the sort key corresponding to at least one attribute associated with the data; and
      transmit the partition key and the sort key to the shared table, wherein the data is written to or retrieved from the shared table based at least in part on the partition key, and the sort key type indicates the shared table of a plurality of shared tables to which the partition key and the sort key are transmitted.

10. The apparatus of claim 9, wherein the instructions are further executable by the processor to cause the apparatus to:
    determine which shared table of the plurality of shared tables to transmit the partition key to based at least in part on identifying the data type identifier associated with the data, wherein the partition key and the sort key are transmitted based at least in part on the determination.

11. The apparatus of claim 9, wherein the sort key type comprises one of a sort key type number, a sort key type string, or a sort key type binary.

12. The apparatus of claim 9, wherein the instructions are further executable by the processor to cause the apparatus to:
    identify a secondary index associated with the data, the secondary index corresponding to one or more attributes that are different than at least one attribute corresponding to the sort key; and
    generate the partition key based at least in part on identifying the secondary index.

13. The apparatus of claim 12, wherein the data written to or retrieved from the shared table based at least on the partition key is sorted according to the secondary index.

14. A non-transitory computer-readable medium storing code for storing data in a shared table of a distributed database, the code comprising instructions executable by a processor to:
    receive a message from a first tenant of a plurality of tenants that indicates data to be written to or retrieved from the shared table, the data corresponding to at least one user record in the shared table;

identify a data key associated with the data, a tenant identifier associated with the data, the tenant identifier corresponding to the first tenant of the plurality of tenants, and a data type identifier associated with the data, the data type identifier corresponding to a logical type of data associated with the data;

generate a partition key, wherein the partition key comprises the data key, the tenant identifier, and the data type identifier;

identify a sort key and a sort key type associated with the data, the sort key corresponding to at least one attribute associated with the data; and transmit the partition key and the sort key to the shared table, wherein the data is written to or retrieved from the shared table based at least in part on the partition key, and the sort key type indicates the shared table of a plurality of shared tables to which the partition key and the sort key are transmitted.

15. The non-transitory computer-readable medium of claim 14, wherein the instructions are further executable by the processor to:

determine which shared table of the plurality of shared tables to transmit the partition key to based at least in part on identifying the data type identifier associated with the data, wherein the partition key and the sort key are transmitted based at least in part on the determination.

16. The non-transitory computer-readable medium of claim 14, wherein the sort key type comprises one of a sort key type number, a sort key type string, or a sort key type binary.

17. The non-transitory computer-readable medium of claim 14, wherein the instructions are further executable by the processor to:

identify a secondary index associated with the data, the secondary index corresponding to one or more attributes that are different than at least one attribute corresponding to the sort key; and generate the partition key based at least in part on identifying the secondary index.

* * * * *